(12) United States Patent
Whelan et al.

(10) Patent No.: US 8,542,147 B2
(45) Date of Patent: Sep. 24, 2013

(54) PRECISE ABSOLUTE TIME TRANSFER FROM A SATELLITE SYSTEM

(75) Inventors: David A. Whelan, Newport Coast, CA (US); Gregory M. Gutt, Ashburn, VA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/267,714

(22) Filed: Oct. 6, 2011

(65) Prior Publication Data

US 2012/0218147 A1 Aug. 30, 2012

Related U.S. Application Data

(63) Continuation-in-part of application No. 12/130,893, filed on May 30, 2008, now Pat. No. 8,035,558.

(51) Int. Cl.
*G01S 19/24* (2010.01)
*G01S 19/39* (2010.01)

(52) U.S. Cl.
USPC ............................... 342/357.63; 342/357.22

(58) Field of Classification Search
USPC ............. 342/357.22, 357.39, 357.42, 357.63; 701/468, 470
See application file for complete search history.

(56) References Cited

U.S. PATENT DOCUMENTS

| | | | |
|---|---|---|---|
| 5,365,450 A | 11/1994 | Schuchman et al. | |
| 5,510,801 A | 4/1996 | Engelbrecht et al. | |
| 5,646,630 A | 7/1997 | Sheynblat et al. | |
| 5,812,086 A | 9/1998 | Bertiger et al. | |
| 5,812,961 A | 9/1998 | Enge et al. | |
| 5,831,574 A | 11/1998 | Krasner | |
| 5,841,396 A | 11/1998 | Krasner | |
| 5,841,398 A | 11/1998 | Brock | |
| 5,944,770 A | 8/1999 | Enge et al. | |
| 6,067,045 A | 5/2000 | Castelloe et al. | |
| 6,157,621 A | 12/2000 | Brown et al. | |
| 6,178,195 B1 | 1/2001 | Durboraw, III et al. | |

(Continued)

FOREIGN PATENT DOCUMENTS

| WO | WO 01/16618 | 3/2001 |
|---|---|---|
| WO | WO 2005/081011 | 9/2005 |

(Continued)

OTHER PUBLICATIONS

Fossa et al., Department of Electrical and Computer Engineering, an Overview of the Iridium Low Earth Orbit (LEO) Satellite System, 1998 IEEE, pp. 152-159.

(Continued)

*Primary Examiner* — Dao Phan
(74) *Attorney, Agent, or Firm* — Haynes and Boone, LLP

(57) ABSTRACT

Various techniques are provided for obtaining a precise absolute time using a satellite system. In one example, a method of transferring precise absolute time from a satellite to a device includes receiving data from a messaging channel, wherein the data has a frame structure. The method also includes using the data to identify the satellite and a position of the satellite, correcting for signal time of flight using the satellite identity and the position, and using the data as a time reference to align a receiver clock to the frame structure. The method also includes, with the receiver clock aligned to the frame structure, receiving a precision time signal from the satellite, wherein the precision time signal comprises a periodic repeating code. The method also includes determining a timing phase of the code and using the timing phase to determine a precise absolute time.

19 Claims, 10 Drawing Sheets

(56) References Cited

U.S. PATENT DOCUMENTS

| | | | |
|---|---|---|---|
| 6,266,533 | B1 | 7/2001 | Zadeh et al. |
| 6,271,788 | B1 | 8/2001 | Longaker et al. |
| 6,373,432 | B1 | 4/2002 | Rabinowitz et al. |
| 6,389,291 | B1 | 5/2002 | Pande et al. |
| 6,400,314 | B1 | 6/2002 | Krasner |
| 6,433,734 | B1 | 8/2002 | Krasner |
| 6,526,352 | B1 | 2/2003 | Breed et al. |
| 6,542,823 | B2 | 4/2003 | Garin et al. |
| 6,633,255 | B2 | 10/2003 | Krasner |
| 6,674,398 | B2 | 1/2004 | Murphy |
| 6,717,547 | B2 | 4/2004 | Spilker et al. |
| 6,785,553 | B2 | 8/2004 | Chang et al. |
| 6,859,173 | B2 | 2/2005 | Spilker et al. |
| 6,922,546 | B1 | 7/2005 | Da et al. |
| 6,937,187 | B2 | 8/2005 | Van Diggelen et al. |
| RE38,808 | E | 10/2005 | Schuchman et al. |
| 7,030,814 | B2 | 4/2006 | Stone et al. |
| 7,042,392 | B2 | 5/2006 | Whelan et al. |
| 7,372,400 | B2 | 5/2008 | Cohen et al. |
| 7,400,857 | B2 | 7/2008 | Chang et al. |
| 2002/0003490 | A1 | 1/2002 | Chang et al. |
| 2002/0082024 | A1 | 6/2002 | Bajikar |
| 2004/0042576 | A1 | 3/2004 | Anderson |
| 2004/0078594 | A1 | 4/2004 | Scott |
| 2005/0156782 | A1 | 7/2005 | Whelan et al. |
| 2005/0159891 | A1 | 7/2005 | Cohen et al. |
| 2006/0250303 | A1 | 11/2006 | Thiel et al. |
| 2007/0058161 | A1 | 3/2007 | Nichols et al. |
| 2007/0236387 | A1 | 10/2007 | Monnerat |
| 2008/0001818 | A1 | 1/2008 | Cohen et al. |
| 2008/0001819 | A1 | 1/2008 | Cohen et al. |
| 2008/0059059 | A1 | 3/2008 | Cohen et al. |
| 2008/0062039 | A1 | 3/2008 | Cohen et al. |
| 2008/0169958 | A1 | 7/2008 | Cohen et al. |
| 2008/0224924 | A1 | 9/2008 | Lethbridge |
| 2009/0315764 | A1 | 12/2009 | Cohen et al. |
| 2009/0315769 | A1 | 12/2009 | Whelan et al. |
| 2009/0318167 | A1 | 12/2009 | Pon et al. |
| 2010/0171652 | A1 | 7/2010 | Gutt et al. |
| 2011/0148701 | A1 | 6/2011 | Cohen et al. |
| 2011/0248887 | A1 | 10/2011 | Whelan et al. |

FOREIGN PATENT DOCUMENTS

| | | |
|---|---|---|
| WO | WO 2007/056738 | 5/2007 |
| WO | WO 2008/105778 | 4/2008 |
| WO | WO 2009/146350 | 12/2009 |

OTHER PUBLICATIONS

U.S. Appl. No. 60/801,764, Cohen et al.

NAL—Network Reference—Iridium Subscriber Unit, http://www.nalresearch.com/NetRef_IridiumSubscriberUnit.html, 2006, 2 pages.

Globalstar—Wilipedia, the free encyclopedia, http://en.wikipedia.org/wiki/Globalstar, Jul. 17, 2006, 3 pages.

Iridium (satellite)—Wikipedia, the free encyclopedia, http://en.wikipedia.org/wiki/Iridium_%28satellite%29, Jul. 19, 2006, 4 pages.

Kyriazakos et al., Localization of Mobile Terminals, based on a Hybrid Satellite-assisted and Network-based Techniques, 2000, 5 pages.

Stamoulakatos et al., A Review on Cellular Location Methods Targeting Location Based Services, Proceedings of the IASTED International Conference, Sep. 8-10, 2004, 7 pages.

Laitinen et al., Cellular network optimisation based on mobile location, 2001, 51 pages.

ECC Report 95, Electronic Communications Committee (ECC) within the European Conference of Postal and Telecommunications Administrations (CEPT), Sharing Between MSS Systems Using TDMA and MSS Systems Using CDMA in the Band 1610-1626.5 Mhz, Feb. 2007, 38 pages.

ICAO Technical Manual for Iridium, Aeronautical Mobile Satellite (Route) Service, Draft v1.1, May 19, 2006, 48 pages.

Implementation Manual for Iridium Satellite Communications Service, Draft v.1.0, Feb. 15, 2006, 59 pages.

Chowdhury M.R. Shahriar, Mitigation of Interference from Iridium Satellites by Parametric Estimation and Substraction, Dec. 1, 2006, 111 pages.

Agrawal et al., "GPS: Location-tracking technology", Computer, IEEE Service Center, Mar. 1, 2002, pp. 92-94.

GPS World, Centimeter-Accuracy lnddor navigation Using GPS-Like Pseudolites, http://www.gpsworld.com/gpsworld/Design+Challenge/Centimeter-Accuracy-Indoor-Navigation-Using-GPS-Li/ArticleLong/Article/detail/3086, Nov. 1, 2001, 7 pages.

Iridium, Decode Systems, http://www.decodessystem.com/iridium.html, Mar. 4, 2009, 10 pages.

ICAO Technical Manual for Iridium Aeronautical Mobile Satellite (Route) Service Draft v.1.1, http://www.icao.int/anb/panels/acp/wg/m/wgm11/acp-wgm11-wp04-draft%2Oiridium%20technical%20specification%20version%201.1%20-%20051906.pdf, May 19, 2006, 48 pages.

PRECISE ABSOLUTE TIME TRANSFER FROM A SATELLITE SYSTEM

CROSS-REFERENCE TO RELATED APPLICATIONS

This patent application is a continuation-in-part of U.S. patent application Ser. No. 12/130,893 filed May 30, 2008, which is incorporated herein by reference in its entirety.

TECHNICAL FIELD

The present invention relates generally to time transfer and, more particularly, to satellite-based time transfer and navigation techniques.

BACKGROUND

Existing navigation and timing signals provided by various existing satellite navigation systems often do not provide satisfactory system performance. In particular, the signal power, bandwidth, and geometrical leverage of such navigation and timing signals are generally insufficient to meet the needs of many demanding usage scenarios.

Existing navigation and timing approaches based, for example, on Global Positioning System (GPS) signals may not be available to a navigation user in many instances. Typically, a GPS receiver must receive at least four simultaneous ranging sources to permit three dimensional positioning and accurate time transfer. However, GPS signals often provide insufficient, low-signal power or geometry to readily penetrate urban canyons or the walls of buildings. Other navigation approaches based, for example, on cellular telephone or television signals typically lack vertical navigation information.

Existing systems have attempted to address indoor navigation deficiencies by the use of various approaches, for example, inertial navigation systems, specialized beacons, and highly sensitive GPS systems. However, inertial navigation systems drift and are expensive. Beacons require specialized fixed assets that are expensive and not standardized thus having only specialized utility, and sensitive GPS systems often do not perform to user expectations due to the weakness of the GPS signals in indoor environments.

SUMMARY

In one embodiment, a method of obtaining precise absolute time transfer from a satellite comprises: receiving a precision time signal from a satellite, wherein the precision time signal comprises a periodic repeating code; determining a timing phase of the code; receiving additional aiding information; and using the timing phase and the additional aiding information to determine a precise absolute time.

In another embodiment, a method of performing navigation in attenuated or jammed environments comprises: detecting a frame structure of a signal received from a first satellite; aligning a clock of a receiver unit to the detected frame structure; generating multiple time estimates respectively separated according to the frame structure, wherein at least one time estimate will be aligned to a signal of a second satellite; providing the time estimates to system correlators of the receiver unit; aligning the system correlators according to the time estimates; and identifying the at least one time estimate that is aligned to the signal source from the second satellite, wherein the at least one time estimate provides successful aiding information to the receiver unit and significantly improves detection efficiency.

In another embodiment, a receiver unit adapted for use in attenuated or jammed environments comprises: an antenna adapted to receive a precision time signal from a satellite and receive additional aiding information, wherein the precision time signal comprises a periodic repeating code; a processor; and a memory adapted to store a plurality of computer readable instructions which when executed by the processor are adapted to cause the receiver unit to: determine a timing phase of the code, and use the timing phase and the additional aiding information to determine a precise absolute time.

In another embodiment, a receiver unit adapted for use in attenuated or jammed environments comprises: an antenna adapted to receive a precision time signal from a first satellite wherein the precision time signal comprises a frequency band frame structure, and to receive a second signal from a second satellite; a processor; and a memory adapted to store a plurality of computer readable instructions which when executed by the processor are adapted to cause the receiver unit to: detect the frame structure of the first satellite; align an internal clock of the receiver unit to the frame structure of the first satellite; generate multiple time estimates respectively separated according the frame structure of the first satellite, wherein at least one time estimate is aligned to the signal from the second satellite; align system correlators of the receiver unit according to the time estimates; and identify the at least one time estimate that is aligned to the signal from the second satellite such that successful aiding information is provided to the receiver unit.

In another embodiment, a method of transferring precise absolute time from a satellite to a device includes receiving data from a messaging channel, wherein the data has a frame structure; using the data to identify the satellite and a position of the satellite; correcting for signal time of flight using the satellite identity and the position; using the data as a time reference to align a receiver clock to the frame structure; with the receiver clock aligned to the frame structure, receiving a precision time signal from the satellite, wherein the precision time signal comprises a periodic repeating code; determining a timing phase of the code; and using the timing phase to determine a precise absolute time.

In another embodiment, a receiver unit adapted for use in attenuated or jammed environments includes an antenna adapted to receive a signal from a satellite acquisition channel or a messaging channel; a processor; a receiver clock; and a memory for storing a plurality of machine readable instructions which when executed by the processor cause the receiver unit to: receive data from the acquisition channel or the messaging channel, wherein the data has a frame structure, use the data to determine an identify of the satellite and a position of the satellite, correct for signal time of flight using the identity of the satellite and the position of the satellite, use the data as a time reference to align the receiver clock to the frame structure, with the receiver clock aligned to the frame structure, receive a precision time signal from the satellite, wherein the precision time signal comprises a periodic repeating code, determine a timing phase of the code, and use the timing phase to determine a precise absolute time.

In another embodiment, a satellite system includes a satellite, wherein: the satellite is adapted to transmit a first data signal on an acquisition channel, the satellite is adapted to transmit a second data signal on a messaging channel, wherein the messaging channel changes frequency and changes time slots according to a known pattern predictable from a time parameter value, and each of the data signals includes information from which a precise absolute time is available for a receiver unit.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
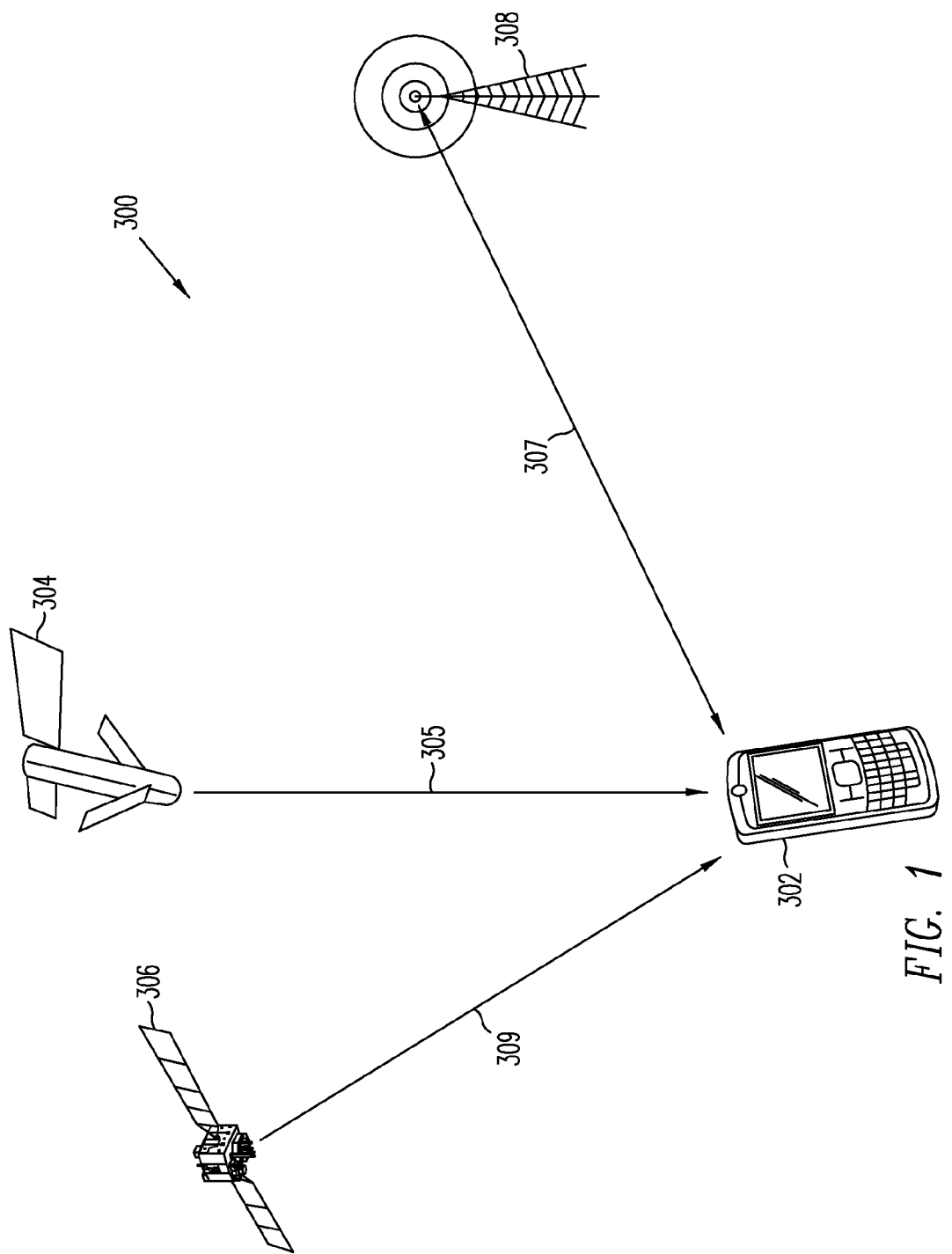
FIG. 1 provides an overview of a navigation system that is able to perform in occluded or jammed environments according to an embodiment of the present invention.

In accordance with various embodiments discussed herein, a system employing satellites, for example, low earth orbit (LEO) satellites, may be used to augment receiver units (also referred to as receivers), for example, cell phones or other compact devices, so that they may function even in heavily attenuated, occluded or jammed environments. Navigation systems according to one or more embodiments herein may address current problems of receiver units that are due to fundamentally weak signals received from existing sources such as Global Positioning System (GPS) satellites.

Signals from certain satellites, for example, communication satellites, are generally more powerful than signals from other existing positioning systems such as GPS. One such satellite is the Low Earth Orbiting Satellite (LEO) constellation Iridium. In an example, a receiver unit configured to work with signals received from a LEO satellite, for example an Iridium satellite, may work with signal levels of less than about 45 dB of attenuation at the receiver unit's antenna, whereas GPS-configured receiver units typically will not work at such levels. By leveraging Iridium satellite signals, the Iridium-configured receiver unit may operate at about 15-20 db below where a typical GPS-configured receiver unit would stop working.

According to various embodiments, such powerful signals, which include precision time signals from the satellite system, may be used to determine a precise absolute time to an accuracy of, for example, approximately 1-10 microseconds. Also, such powerful signals may be transferred to a receiver unit along with information from other ground based infrastructure, such as a cellular network, an internet network, or WiFi. According to one or more embodiments, the precise absolute time derived from the satellite signals is sufficiently accurate to facilitate aligning system correlators in a receiver unit to focus in very narrow periods of time. When multiple system correlators are used without the benefit of a precise time reference in occluded or jammed environments, the correlation process is computationally burdened by searching over large time periods and the receiver unit may not be able to perform under such conditions. However, with the transfer of precise absolute time (e.g., having an accuracy within approximately 10 microseconds) a receiver unit (or user) may better receive and track navigation signals from a positioning system such as GPS by aligning the receiver unit's system correlators even in highly attenuated or jammed environments. Thus, embodiments of the present invention may aid GPS or any other positioning satellite system in heavily attenuated or jammed environments. It should be appreciated that precise absolute time transfer may also be used in other applications such as network synchronization.

In various embodiments, the receiver units described above may use a known frequency (e.g., the Iridium ring channel is used for acquisition in several embodiments) to acquire the LEO satellite signal (e.g., also referred to as initiating the receiver). In environments where the acquisition channel may be unavailable (e.g., in cases where the signal is jammed or other interference occurs at the specific frequency of the acquisition channel), a receiver of an alternative embodiment may use an acquisition channel (e.g., a channel other than the acquisition channel) of the satellite system to initiate the receiver for time alternating transmissions (e.g., frequency hopping). In one embodiment, for example, the system (including the receiver) may use a method of channel acquisition in which the "primary" satellite acquisition frequency (e.g., channel) may be jammed or otherwise unavailable to the receiver, and a "secondary" frequency (e.g., channel) that may be within the same satellite transmission may be used to provide precise absolute time to the receiver.

A system, for example, that uses a fixed known channel (e.g., a constant time slot combined with a constant carrier frequency in that time slot) such as the Iridium ring channel (e.g. the acquisition channel) to establish communication between satellites and the receiver may be susceptible to jamming because the jammer can focus power to increase its jamming potential at the acquisition channel alone to knock out the acquisition channel's, and thus the system's, functionality. To address such issues, a secondary transmission of timing and other information may be provided on additional channels of the satellite system. For example, with Iridium, additional information may be provided on four additional messaging channels or even broadcast over the entire 10 Mega-Hertz (MHz) Iridium frequency band, requiring a jammer to fan its power over the full spectrum of the band to be effective, and thus reducing the jammer's jamming potential. The relative transmit power and signal encoding scheme of such a broadcast transmission on even only four frequencies can provide additional processing gain beyond that of the acquisition channel (e.g., the fixed known channel) and further reduce susceptibility to jamming compared to a system that uses only the fixed known channel.

In alternative embodiments, the primary (e.g., acquisition channel) and secondary (e.g., additional) channels may be on different satellites within the same satellite constellation or even may be on different constellations. In one embodiment, the alternative transmission information and timing data may be transmitted over more than one channel (e.g., different frequencies and time slots) to maximize jamming resistance. In another embodiment, the system may transmit the alternative information using a transmission source other than a satellite, for example, via wireless network signals or from a satellite through a ground network including wireless communications.

Referring now to the figures wherein the showings are for purposes of illustrating embodiments of the present invention only, and not for purposes of limiting the same, FIG. 1 provides an overview of a navigation system 300 that is able to perform in occluded or jammed environments according to an embodiment of the present invention.

As shown in the embodiment of FIG. 1, in navigation system 300, a receiver unit 302 (e.g., a cellular telephone), is configured to receive signal 309 from a satellite 306, which may include a global positioning system (GPS) signal (e.g., protected and/or unprotected GPS signal) from conventional navigation satellites. In addition, receiver unit 302 is configured to receive signal 305 from a satellite 304, which may be a low earth orbit (LEO) satellite. Furthermore, receiver unit 302 is configured to receive signal 307 from a network 308, which may include, for example, a cellular network, an Internet network, a WiFi network, and/or other networks. Signal 305 received from satellite 304 comprises a precision time signal coded on satellite 304. Signal 307 received through network 308 may include additional aiding information such as, for example, orbit information associated with satellite 304, an approximate location of receiver unit 302, an approximate range between satellite 304 and receiver unit 302 (e.g., within approximately 3000 m), approximate time information (e.g., approximate time within about 5 seconds), timing bias information associated with satellite 304 (e.g., satellite clock offsets), and/or other information.

According to one or more embodiments, satellite 306 may be a part of an integrated high-performance navigation and communication system such as an iGPS system. Satellite 306 may also be a part of any other positioning system satellite, including for example, the Global Orbiting Navigation System (GLONASS).

In one example, satellite 304 may be a LEO satellite, which may be implemented by a satellite of an existing communication system (e.g., Iridium or Globalstar satellite systems). In one example where an Iridium satellite is used to implement satellite 304, flight computers of the Iridium satellite may be reprogrammed with appropriate software to facilitate the handling of navigation signals. In another example where a Globalstar communication satellite is used to implement satellite 304, the satellite bent pipe architecture permits ground equipment to be upgraded to support a variety of new signal formats.

In embodiments where satellite 304 is implemented as a LEO communication satellite, the LEO communication satellite may be configured to support communication signals as well as navigation signals. In this regard, such navigation signals may be implemented to account for various factors such as multipath rejection, ranging accuracy, cross-correlation, resistance to jamming and interference, and security, including selective access, anti-spoofing, and low probability of interception.

Receiver unit 302 may be implemented with appropriate hardware and/or software to receive and decode signals from a variety of space and terrestrial ranging sources to perform navigation. Such signals may include, for example, satellite broadcasts from GPS (or any other positioning system (e.g., Glonass), LEO (e.g., Iridium or Globalstar satellite systems), Wide Area Augmentation System (WARS), European Geostationary Navigation Overlay Service (EGNOS), Multifunctional Satellite Augmentation System (MSAS), Galileo, Quasi-Zenith Satellite System (QZSS), and/or Mobile Satellite Ventures (MSV) satellites. Such signals may also include terrestrial broadcasts from network 308, which may include cellular networks, TV networks, Internet networks, WiFi, WiMAX, National Vehicle Infrastructure Integration (VII) nodes, and other appropriate sources. Receiver unit 302 may be implemented in accordance with various embodiments set forth in U.S. Pat. No. 7,372,400 issued on May 13, 2008 which is incorporated herein by reference in its entirety.

Receiver unit 302 may be further configured to receive and perform navigation using broadcasted signals of other space and terrestrial ranging sources as may be desired in particular embodiments. In addition, receiver unit 302 may be configured with an inertial measurement unit (IMU) implemented, for example, as a microelectromechanical system (MEMS) device to provide jamming protection.

Receiver unit 302 may also be implemented in any desired configuration as may be appropriate for particular applications. For example, in various embodiments, receiver unit 302 may be implemented as a cellular telephone, an iGPS receiver, a handheld navigation device, a vehicle-based navigation device, an aircraft-based navigation device, or other type of device. In an embodiment, the position of receiver unit 302 may correspond to the position of a user.

Figure 1A:
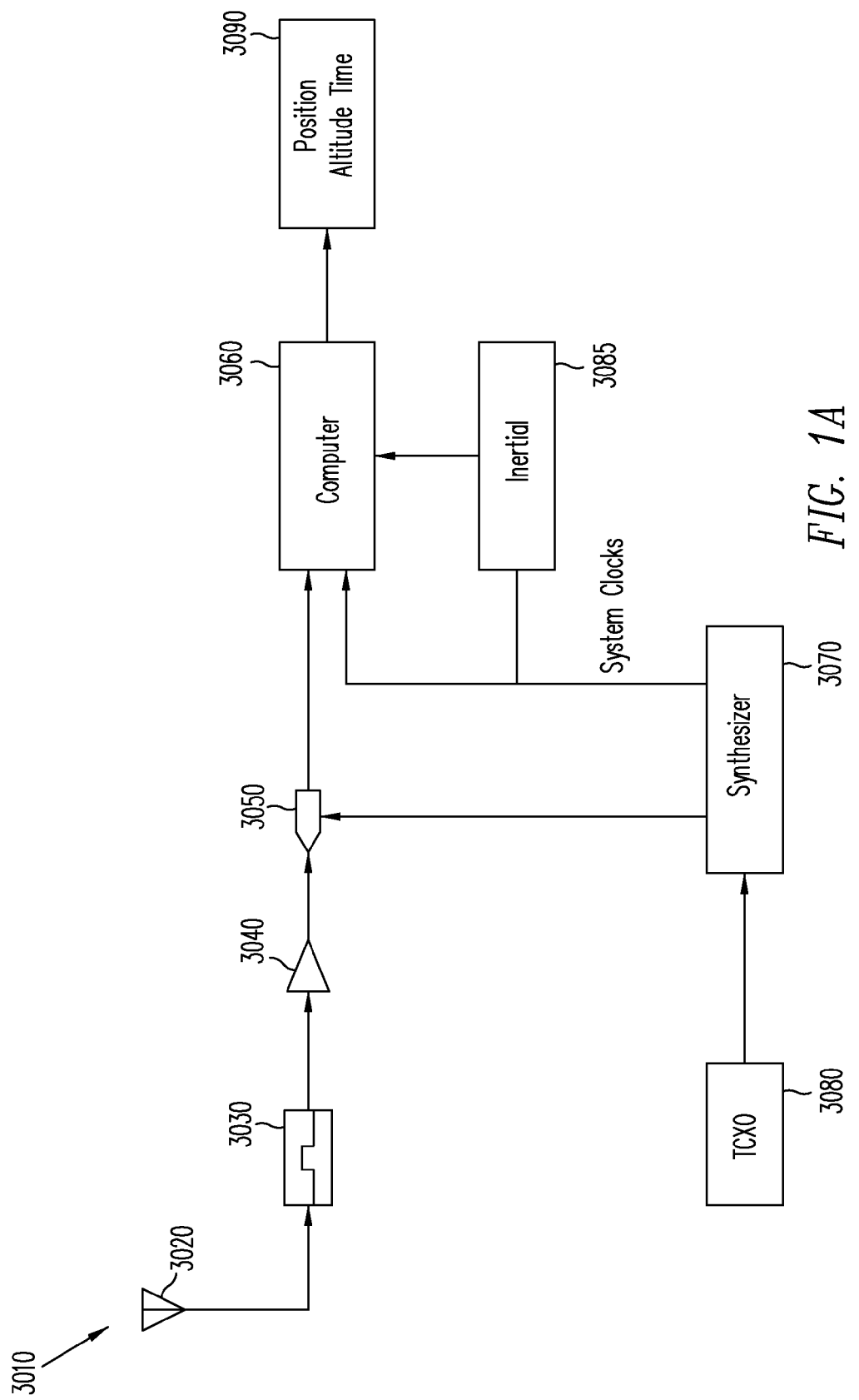
FIG. 1A shows a functional block diagram of receiver unit 302 according to an embodiment of the disclosure.

Referring to FIG. 1A, a functional block diagram of receiver unit 302 is shown according to an embodiment of the disclosure. Receiver unit 302 includes a multi-frequency antenna 3020 adapted to receive satellite signals 3010 from one or more satellites. Antenna 3020 may also be adapted to receive signals from network 308 of FIG. 1, for example. Antenna 3020 is coupled to one or more pre-select filters 3030, an amplifier 3040 and an A/D converter 3050. Synthesizer 3070 receives a signal from temperature controlled crystal oscillator (TCXO) 3080, and is coupled to A/D converter 3050, inertial 3085 and computer 3060, which comprises a memory and a processor (not shown). System correlators may be implemented by the processor. Computer 3060 receives raw measurements from inertial 3085 as well as input from synthesizer 3070 and A/D converter 3050 to produce an output of position, altitude, and time 3090. The sampling rate of A/D converter 3050 may be appropriately determined such that receiver unit 302 may downconvert to baseband all bands of interest.

In operation, according to one or more embodiments, in locations where receiver unit 302 is occluded or jammed and cannot receive signal 309 (e.g., GPS signal) from satellite 306, receiver unit 302 may send a message to network 308 requesting assistance. Network 308 then determines additional aiding information. Receiver unit 302 then uses signal 307, which comprises the additional aiding information obtained through network 308 in combination with signal 305 received from satellite 304, which comprises a precision time signal, to align its system correlators to improve reception of signal 309 (e.g. GPS signal) from satellite 306 and therefore be able to perform navigation even in occluded or jammed environments.

Figure 2:
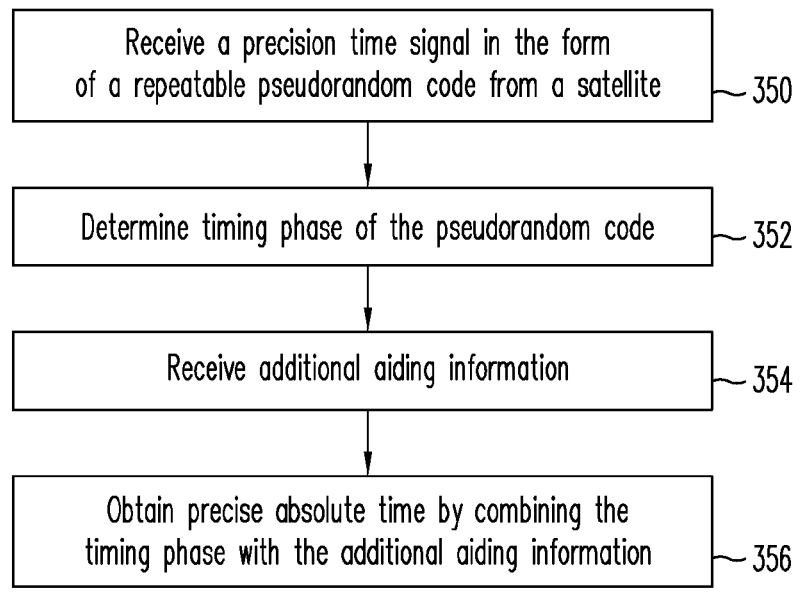
FIG. 2 provides a flow diagram illustrating a method of obtaining precise absolute time transfer from a satellite according to an embodiment of the present invention.

Referring now to FIG. 2, a flow diagram is provided that illustrates a method of obtaining precise absolute time transfer from a satellite according to an embodiment of the present invention. In an embodiment, FIG. 2 may be implemented for use with navigation system 300 of FIG. 1, but it may also be implemented for use with other systems or applications, such as network synchronization. Signal 305 received from satellite 304 (as shown in FIG. 1) permits localization when combined with signal 307, which comprises additional aiding information. The additional aiding information may be delivered to receiver unit 302 through network 308.

In block 350, receiver unit 302 receives signal 305, which comprises a precision time signal, from satellite 304. The precision time signal is received as a well-defined code that repeats periodically from satellite 304. It will be appreciated that a well-defined code may include any number of codes, for example, a pseudorandom code. In an example, an Iridium satellite may broadcast a pseudorandom code that repeats approximately every 23 seconds. Other implementations may include an alternating code structure. For example, in one such implementation, a coarse timing code may be followed by a pseudorandom code. In this implementation, the coarse timing code may comprise a repeating segment of pure carrier frequency which may be easily detected by receiver unit 302 for use with various operations, such as determining Doppler shift. The pseudorandom code in this implementation may be used to determine absolute time to high accuracy, but may be more difficult for receiver unit 302 to detect than the coarse timing code. In this regard, the coarse timing code may be used by receiver unit 302 to efficiently determine the approximate times at which the pseudorandom code is expected to be received.

In various embodiments, signal 305 received from satellite 304 is not required to include detailed navigation information and only one broadcast of signal 305 from a single one of satellites 304 may be used to initiate the aiding technique. Furthermore, the timing accuracy of signal 305 may be sufficiently degraded from typical GPS satellite performance, but accuracy on the order of 10 microseconds is sufficient. In one example, receiver unit 302 may operate in an attenuated or occluded environment (e.g., indoors) where the receiver unit 302 is able to receive signal 305 from satellite 304, but unable to receive signal 309 from satellite 306 due to the lower power of signal 309 and the attenuation of the environment. For Iridium satellites, for example, the structure of the repeatable pseudorandom code allows the receiver unit 302 to lock onto the pseudorandom code even in heavily attenuated environments up to about 45 dB attenuation at the antenna, that is, about 15 dB beyond where most GPS receivers fail to receive. Receiver unit 302 may also operate, for example, in environments where signal 309 is potentially jammed by a competing signal in a commercial scenario, or where signal 309 is intentionally jammed by an enemy in, for example, a military scenario.

In block 352, the relative timing phase of the code (also referred to as "n" or "code phase" below) of signal 305 from satellite 304 is determined by receiver unit 302 using low data rate correlation. For example, receiver unit 302 may be used to lock onto the code of the high power non-GPS precision time signal provided by signal 305 and determine the timing phase to within less than about 3 microseconds.

In block 354, receiver unit 302 receives signal 307, which includes additional aiding information through network 308. Alternatively, the additional aiding information may be received from satellite 304 in the case where, for example, receiver unit 302 is moving in and out of attenuated environments. In general, the update rate of the additional aiding information is rather low and could in principle be stored for 24 hours or longer. In one embodiment, the additional aiding information may comprise: the starting time of the code broadcasts, the expected frequency of the timing transmissions, a model of the non-GPS satellite orbits, and time bias correction information that may improve the fidelity of the precision time signal received from satellite 304 as described in block 350. Additionally, approximate time (e.g., within several seconds of accuracy) may be provided through network 308 or by a local clock of receiver unit 302.

In block 356, the timing phase of the code is converted to precise absolute time by combining the timing phase of the code with the additional aiding information that may be received through network 308 according to, for example equation 406 that will be described below with respect to FIG. 3.

Figure 3B:
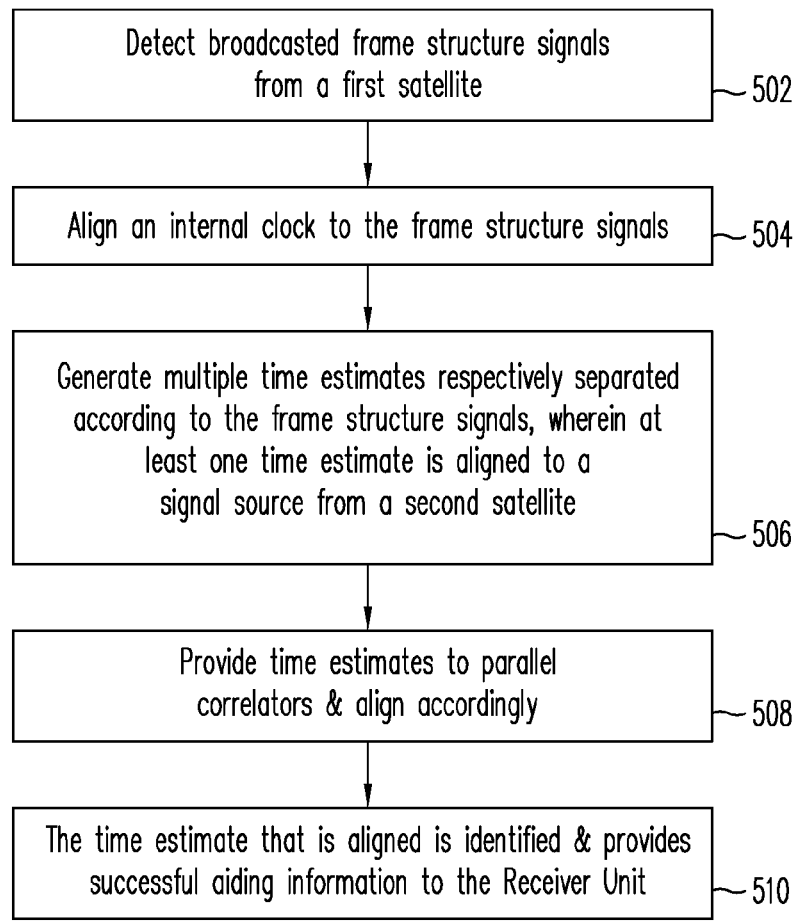
FIG. 3B provides a flow diagram illustrating a method of performing time transfer and navigation in attenuated or jammed environments according to an embodiment of the present invention.
Figure 3:
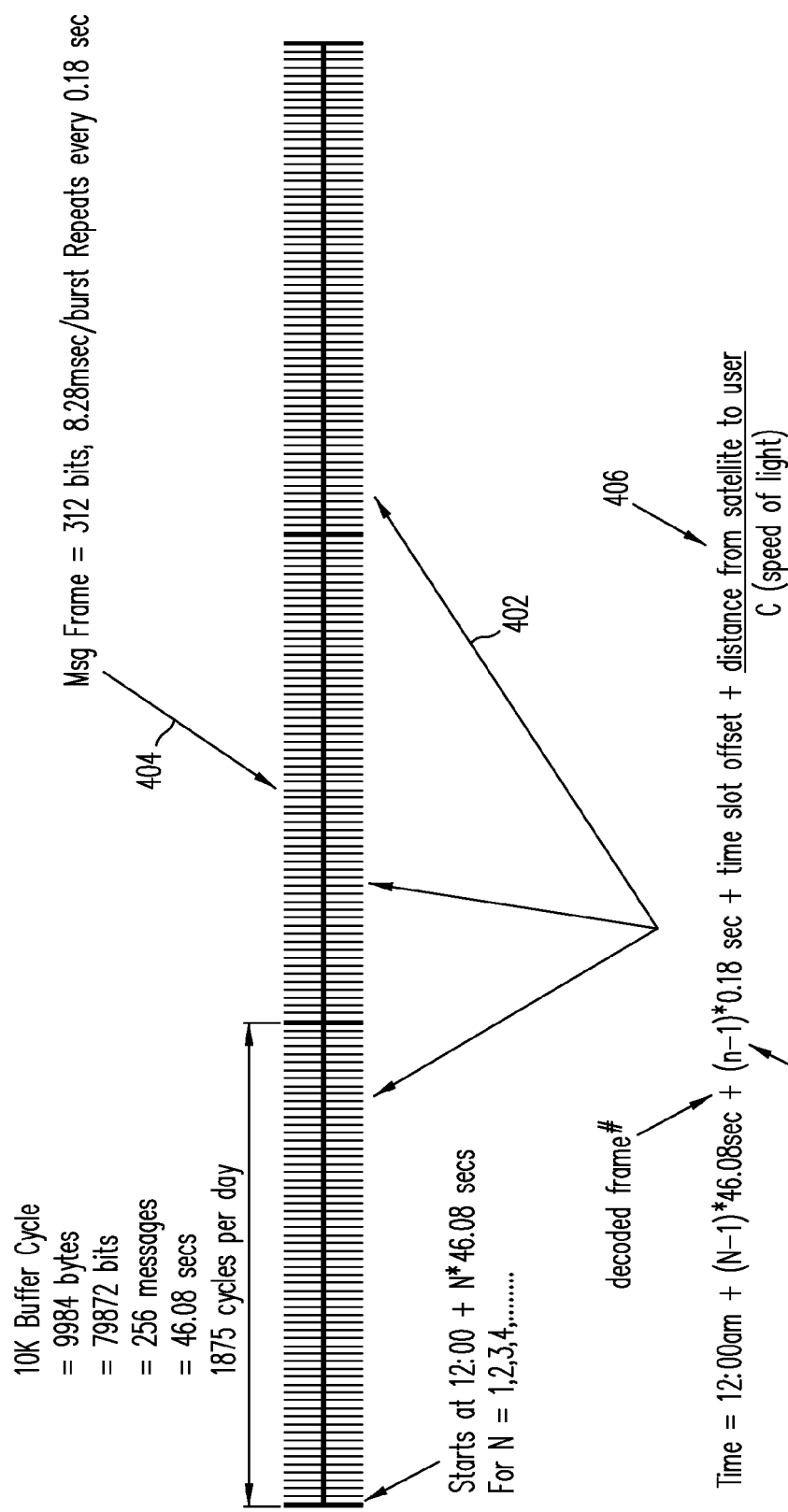
FIG. 3 illustrates a time transfer structure signal of a low earth orbit (LEO) satellite according to an embodiment of the present invention.

Referring now to FIG. 3, a time transfer structure signal of a low earth orbit (LEO) satellite is illustrated according to an embodiment of the present invention. The time transfer structure of FIG. 3 may be implemented for use in navigation system 300 of FIG. 1 according to an embodiment, but it may also be used in other systems or applications such as network synchronization. In this embodiment, satellite 304 is implemented with an Iridium satellite. It will be appreciated that although the time transfer signal for an Iridium satellite is illustrated, the description herein may be modified as appropriate for other satellite systems. In the example of FIG. 3, signal 305 may comprise 10K buffer cycles 402 that are repeatedly broadcasted by each satellite 304. Each 10K buffer cycle may be equal to 9984 bytes, or 79872 bits, or 256 messages, or 46.08 seconds. There are 1875 buffer cycles per day. A message frame 404 (also referred to as a message) is also illustrated, which may be equal to 312 bits or 8.28 milliseconds (ms or msec) per burst. Other bits may be predefined by satellite 304. The 312 bits of message frame 404 are generally payload bits where communications, for example, telephone calls, occur with a voice update every 90 milliseconds. Each frame repeats every 0.18 seconds (180 milliseconds) and all bits may be used to detect the edge of message frame 404. A burst may be offset by a specified "time slot" within the message frame 404.

If, for example, a pseudorandom code is 312 bits, there is a full buffer with 256 messages. In this example, each message has its own pseudorandom code such that it is not confused with other codes. The pseudorandom code may repeat approximately every 20-40 seconds. A known, simple pseudorandom code (or other code) may be employed to distinguish between the 256 messages and provide significant processing gain. In one embodiment, alternating between a coarse simple code (e.g., that promotes the detection of the carrier frequency) and a more precise pseudorandom code (e.g., that permits more accurate time alignment) may be performed.

In one example, receiver unit 302 may be used to determine what time it is. A buffer is loaded and broadcasting starts. The receiver unit 302 tunes into the right frequency and finds bits in the L band frame. The receiver unit 302 finds a code that matches an nth message of the buffer. However, this does not tell what time it is, only that it is the nth message (or the "code phase" of the repeating code). The band frame repeats every 90 milliseconds, and an L band frame count (LBFC) relative to the buffer may be calculated for each L band frame as approximately the number of 90 millisecond periods that have elapsed from the beginning of the buffer to the L band frame being counted.

The timing phase information and the additional aiding information as described in blocks 352 and 354 of FIG. 2 may be combined as set forth in block 356 of FIG. 2 to form an equation to obtain precise absolute time as in the following example with respect to the embodiment of FIG. 3, where equation 406 is used to determine time. In equation 406, it is assumed that 256 unique messages repeat every 46.08 seconds:

Time=12:00 am start time+(N−1)*46.08 sec+
(n−1)*0.18 sec+Time Bias+Range/C(speed of
light)

Here, a known start time of the satellite 304 buffer playback, which may be delivered via data link, may be 12:00 am at a defined date, as illustrated in equation 406 of FIG. 3. "N" (also referred to as "current buffer cycle") is the number of times the pseudorandom code block of 256 messages has repeated since the start time. In one embodiment, "N" may be determined by a local clock of receiver unit 302 with accuracy of about less than 10 seconds. If the message broadcasts at 12:00 am, for example, and receiver unit 302 has a clock synchronized to network 308, receiver unit 302 may determine the current buffer cycle "N". That is, the receiver unit 302 helps resolve the number "N" based on certain known variables.

The parameter "n" is the code phase within the repeating sequence. In the example of equation 406, a time message plays every 0.18 seconds and comprises 256 unique pseudorandom messages. Afterwards, the pseudorandom code repeats from the beginning. Therefore "n" is a number between 1 and 256. "n" is measured from satellite 304 using, for example, the pseudorandom code, and it is accurate to less than approximately 10 microseconds. Because the time messages repeat every 180 milliseconds and the L band frame repeats every 90 milliseconds, it may be seen that the relationship between the L band frame count, LBFC, and "n" is approximately LBFC=2*n as shown in FIG. 3.

If receiver unit 302 knows which message is received, then the code phase "n" may be determined. Receiver unit 302 may perform a correlation to determine which message was received even in the presence of noise. For example, if noise is present, random bits may be received, then the message, then random bits again. Thus, the message may be corrupted by noise and may include corrupted bit values. Assuming that a long message is sent, for example, a 1000 bit message, the bits may be compared to the bits received. If, for example 980 bits are correct, then the next 1000 bits are compared and so on until a peak is reached. A peak is reached when the number of correct bits is greater than the average number. In the example of sending a message of 10.00 bits, if the peak is, for example, 600, then it is determined that that is the correct message. Thus, the message is received and statistically determined in the presence of noise at a particular time. A method for determining the code phase "n" of a received satellite signal will be described in FIG. 3A below according to an embodiment.

"Time Bias" may represent any timing bias in system 300, for example, and may compensate for measured errors in the clock of satellite 304 and/or known time slot changes in the transmission sequence. Time slots may be provided by satellite 304, or they may be measured by a reference station, or they may be fixed or predictable as part of the service. In the example of FIG. 3, Iridium's message frame of 90 milliseconds may be broken up into time slots. As shown in FIG. 3, bursts may occur and may be offset by a specified time slot within the message frame. Receiver unit 302 may know which time slot to use through network 308. Network 308 provides basic information such as the frequency of transmission, that is, the sub band of the transmission, which changes frequently depending on, for example, the frequency of broadcasting and/or other factors.

"Range" represents the distance between satellite 304 and receiver unit 302, and is computed using an orbit model for satellite 304 that may be delivered via data link, suitably accurate knowledge of the position of receiver unit 302, and approximate time (as an input to a satellite orbit model). In one embodiment, to obtain an accuracy within about 10 microseconds, the range estimate must be accurate to about 3000 m, which may equate to about 20,000 m of horizontal accuracy on the ground. This level of positioning may be easily achieved, for example, via cell network techniques. Additionally, simple beam coverage methods may be employed to determine the position of receiver unit 302 based on the knowledge of which non-GPS satellite beam the user is presently located in and the recent beam time history. Numerous other methods of coarse positioning may also be suitably employed. In one embodiment, satellite orbit information (ephemeris) for satellite 304 includes information such as the location of satellite 304 within a constellation of satellites at various points in time and other information that can be used by receiver unit 302 to accurately obtain clock values from satellite 304. In this embodiment, network 308 may easily determine the location of receiver unit 302 (or the user) within less than one kilometer. The range may be accurate to about 3 kilometers. The approximate time of receiver unit 302 may be used with the orbit information to determine the location of satellite 304. After the range of satellite 304 is determined, it is then divided by the speed of light (also referred to as "C").

Figure 3A:
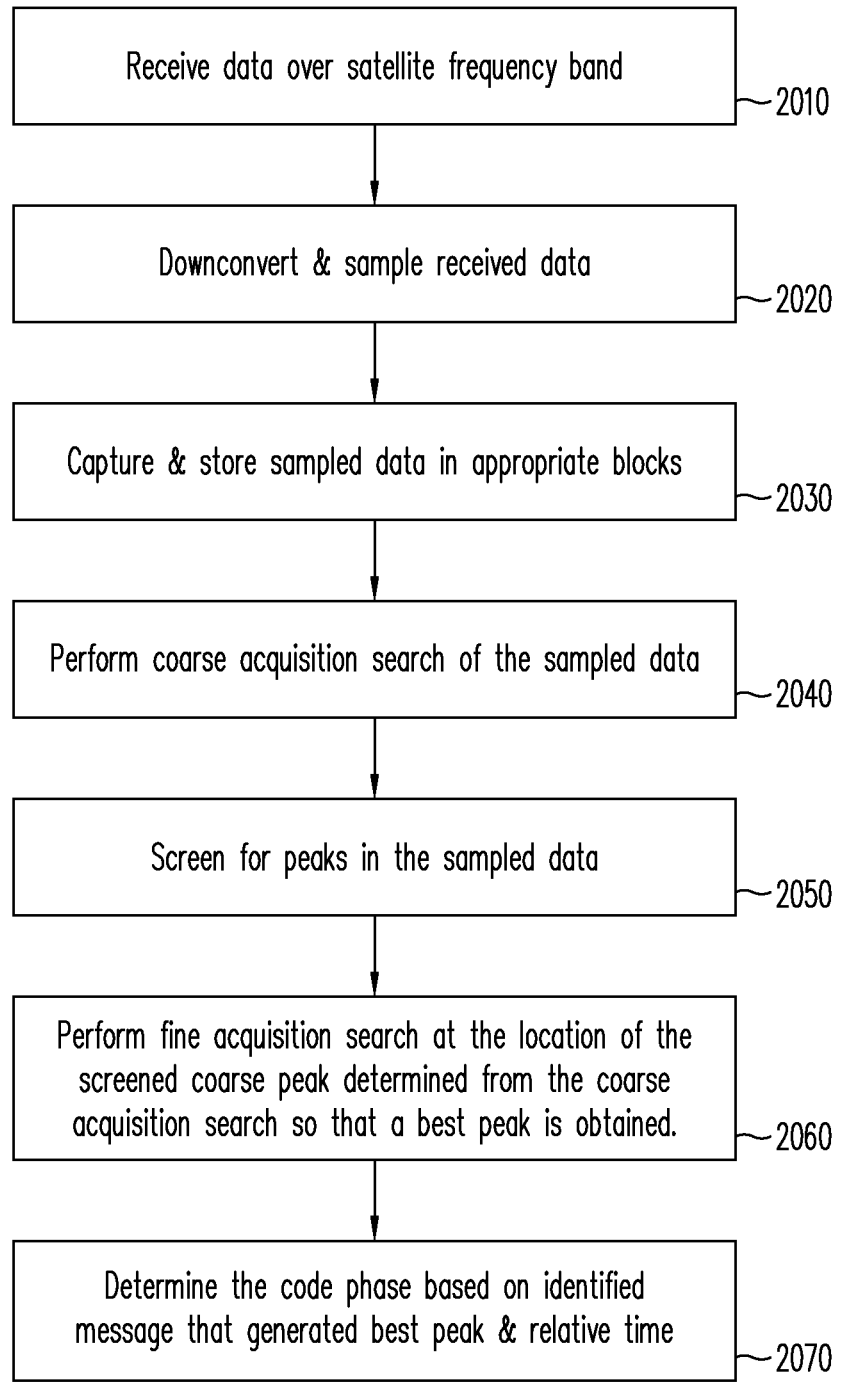
FIG. 3A shows a flow diagram of a method for determining the code phase of a received satellite signal according to an embodiment.

FIG. 3A shows a flow diagram of a method for determining the code phase of a received satellite signal according to an embodiment. FIG. 3A is an example wherein satellite 304 comprises an Iridium satellite. In block 2010, a signal comprising data may be received from an Iridium satellite and collected over the entire Iridium frequency band with a receiver unit having an appropriate antenna, an amplifier and a downconverter (as shown in FIG. 1A). In block 2020, the received data may be downconverted, for example, by 1606 MHz, and the data may be sampled, for example, at 50 Msamples per second.

In block 2030, the sampled data may be captured and stored in memory in appropriate blocks, for example, in blocks of one second segments.

In block 2040, a coarse acquisition search of the sampled data is performed. In this example, approximately 9 milliseconds of data may be selected for detailed processing. Doppler of the captured data may be estimated using a known orbit model and an estimated time. The data may be digitally demodulated with sine and cosine functions based on a known (or estimated) frequency sub-band and access. Demodulation also includes the estimated Doppler frequency. The data may then be decimated by a factor of, for example, approximately 111. A Fast Fourier Transform (FFT) may be used on the decimated data to determine the highest peak and associated frequency. It should be noted that the associated frequency may be used to further improve demodulation in the next iteration. Demodulation in general would yield a DC result, however, imperfect Doppler estimates generally generate a low frequency component. Next, the following 1 millisecond block of sampled data may be considered and the process may be repeated.

In block 2050, the processed data is screened for peaks performing consistency checks. For example, peaks should be separated by "n"*90 milliseconds.

In block 2060, once peaks are screened, fine acquisition may be performed at the location of the coarse peak+180 milliseconds−0.5*window. The window represents the range in time where the code is expected to be found. For example, the received data may be correlated against the 128 non-zero messages in the code; the highest correlation peak may then be recorded; and the time step may be incremented by a certain number of microseconds. This process may then be repeated for the duration of the window.

In block 2070, the code phase may be determined by the receiver unit when the data was captured by knowing which message generated the best peak and knowing the relative time. Once the code phase is determined, precise absolute time may be determined as described above with respect to equation 406 of FIG. 3.

After precise absolute time is computed according to the techniques described above according to one or more embodiments, the precise absolute time may be used in numerous applications such as network synchronization or as an aid to a positioning system such as GPS.

In the positioning aiding embodiment, the precise absolute time determined as described above may be employed to "focus" or align correlators of receiver unit 302, for example a GPS receiver. In this case, a GPS receiver may have numerous parallel positioning system correlators which, when sufficiently time-aligned (e.g., using the techniques described herein), may be able to lock on to signal 309, for example a GPS signal, from satellite 306, for example a GPS satellite, even in a jammed or attenuated environment.

Receiver unit 302 may also compensate for Doppler shift, which refers to a change in frequency of emitted waves produced by motion of an emitting source relative to an observer. As a satellite moves through the sky, the transmission frequency of the satellite signals changes. By using its knowledge of time, receiver unit 302 may predict and compensate for Doppler shift such that the correct frequency may be acquired. In one embodiment, Doppler shift may be calculated by the following equation:

Doppler=range rate÷C×normal frequency of transmission

As discussed above, the range to satellite 304 is the distance between the locations of receiver unit 302 and satellite 304. The range rate is a function of range and time not unlike for example, the measurement of velocity based on the distance traveled between two different points in time. Finally, in the Doppler equation above, the nominal frequency of transmission for an Iridium satellite, for example, may be on the order of 1.6 GHz. "C" refers to the speed of light.

Network 308 provides satellite information as well as pre-tuning information for signals such that as Doppler shift occurs, the signals change to stay in tune accordingly.

The Doppler profile of satellite 304 may also aid in determining timing information. Receiver unit 302 may monitor various signals 305 received from satellite 304 over time. By determining the Doppler shift that occurs as satellite 304 moves overhead, receiver unit 302 may obtain a precise determination of the position of receiver unit 302 and timing information. Thus, with reference again to equation 406 in FIG. 3, the estimate of the location of receiver unit 302 may be performed by referring to the Doppler profile of satellite 304.

Thus, in the embodiments described above, precise absolute time according to equation 406 may be conveyed to receiver unit 302 where there is a ground network (e.g., network 308) to support a space network (e.g., one or more of satellites 304 and/or 306).

In another embodiment, which will be described in more detail with respect to FIG. 3B below, precise absolute time may be achieved in the absence of additional aiding information provided as described above by using, for example, the native L band burst structure signal of an Iridium satellite. In various embodiments, satellite 304 may be a LEO satellite such as Iridium and satellite 306 may be a GPS satellite. In such embodiments, it is known that an Iridium satellite uses frequencies according to an L band structure from 1610 MHz to 1625 MHz. GPS carriers are also in the L band, centered at 1176.45 MHz (L5), 1227.60 MHz (L2), 1381.05 MHz (L3), and 1575.42 MHz (L1) frequencies. Because of the proximity between the Iridium and GPS frequencies, receiver unit 302 is capable of receiving signals together from both satellite systems, Iridium and GPS satellite systems, without the need for an extra antenna.

Each Iridium satellite maintains an internal clock that is monitored and maintained to an accuracy of within 10 microseconds with respect to Coordinated Universal Time (UTC, Fr. Temps Universel Coordonné, also known as Greenwich Mean Time or Zulu time) without clock drift. Thus, L band signals provided by Iridium satellites may be accurately tied to UTC time within approximately 10 microseconds. The L band Iridium satellite signals are structured with 90 millisecond frames. Thus, by determining the edges of L band frames of Iridium satellite signals, accurate timing information may be obtained.

Referring now to FIG. 3B, a flow diagram illustrating a method of performing time transfer and navigation in attenuated or jammed environments according to an embodiment of the present invention is provided. The method illustrated in FIG. 3B may be implemented with the navigation system of FIG. 1, except that in this embodiment, additional aiding information provided via network 308 is unavailable.

In block 502, the broadcasted frame structure of signal 305 (e.g., when implemented by L band Iridium satellite signals) from satellite 304 is detected by receiver unit 302. Even without a well-defined or refined code, it is possible for receiver unit 302 to detect the L Band frame of the Iridium transmission signals. Because in this embodiment it is assumed that additional aiding information is unavailable from network 308, receiver unit 302 prepares successive guesses or estimates of absolute time. With sufficient prior knowledge the number of time estimates may often be bound to a reasonable number. For example, within 100 frames of the Iridium frame structure there is a GPS second that lines up. Thus, the number of time estimates or guesses may be reduced to 100 times.

In block 504, once successive estimates are produced, a local clock of receiver unit 302 is aligned to the frame structure of signal 305 of satellite 304.

In block 506, multiple time estimates that are respectively separated according to the frame structure signals are generated wherein at least one time estimate is aligned to signal 309 of satellite 306.

In block 508, the time estimates may be provided to parallel correlators of receiver unit 302. The parallel correlators are then aligned according to the time estimates.

In block 510, the time estimate that is aligned to signal 309 of satellite 306 is identified and provides aiding information to receiver unit 302. This aiding information significantly improves the ability of receiver unit 302 to efficiently detect signal 309 of satellite 306. That is, as discussed above according to an embodiment where an Iridium satellite is used to implement satellite 304, it is possible to leverage numerous parallel phone calls, for example, to determine the frame edge of the satellite signal frame structure. In this example, Iridium has a frame structure of 90 milliseconds. Within every 100 frames, there is a corresponding GPS second that lines up therewith. Therefore, by simply knowing the frame edge, GPS processing is significantly improved as it is easier to obtain aiding information by trying 100 frames than by trying an infinite number of estimates.

The systems and methods described above with respect to FIGS. 1-3B for obtaining a precise absolute time according to one or more embodiments may be used to facilitate indoor navigation by instantaneously initializing a survey of a wireless network station (e.g., a WiFi transceiver, a WiFi-compatible device, 802.11-compatible device, or other wireless device). According to one or more embodiments, by using the precise absolute time described above, wireless network stations (e.g., Internet hotspots and/or other types of wireless network stations) may act as positioning beacons (with a surveyed location) for receiver unit 302. As a result, a roaming user of receiver unit 302 may navigate in indoor environments.

Figure 4:
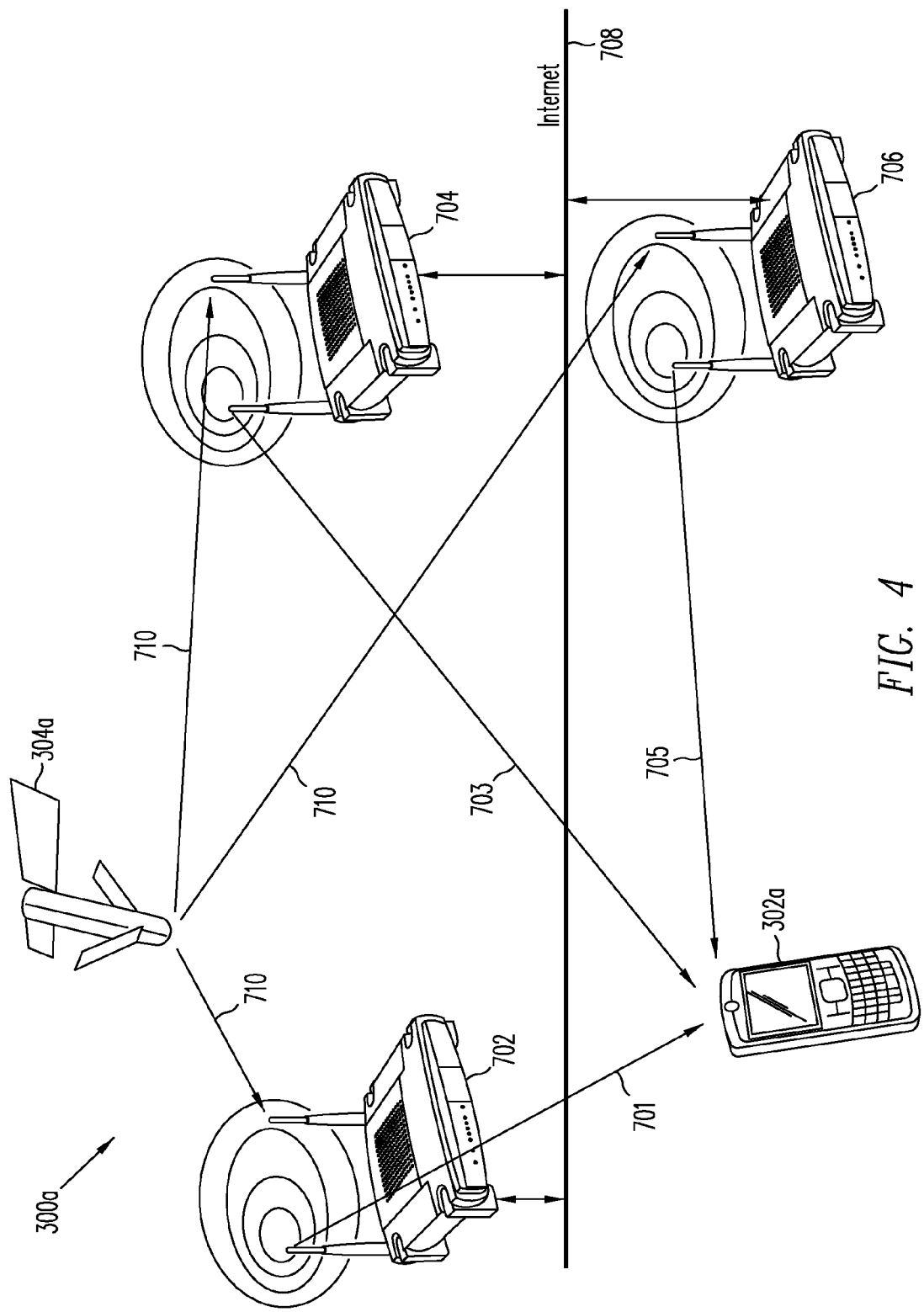
FIG. 4 provides a self forming navigation system that uses satellites to provide wireless network station localization according to an embodiment of the present invention.

FIG. 4 provides a self forming navigation system 300a that uses satellites to permit wireless network station localization according to an embodiment of the present invention. In FIG. 4, a receiver unit 302a may be configured to receive ranging signals 701, 703, and 705, which may comprise aiding information from wireless network stations 702, 704, and 706. Each wireless network station 702, 704, and 706 is in signal communication with network 708 and also receives precision time and ranging signals 710 from satellite 304a. In one embodiment, the position of a receiver unit 302a may correspond to the position of a roaming user.

It will be appreciated that wireless network stations 702, 704 and 706 may include WiFi transceivers as well as other wireless network station devices, configurations, and/or networks. In addition, network 708 may include the Internet or other appropriate networks such as cellular networks or TV networks.

Figure 5:
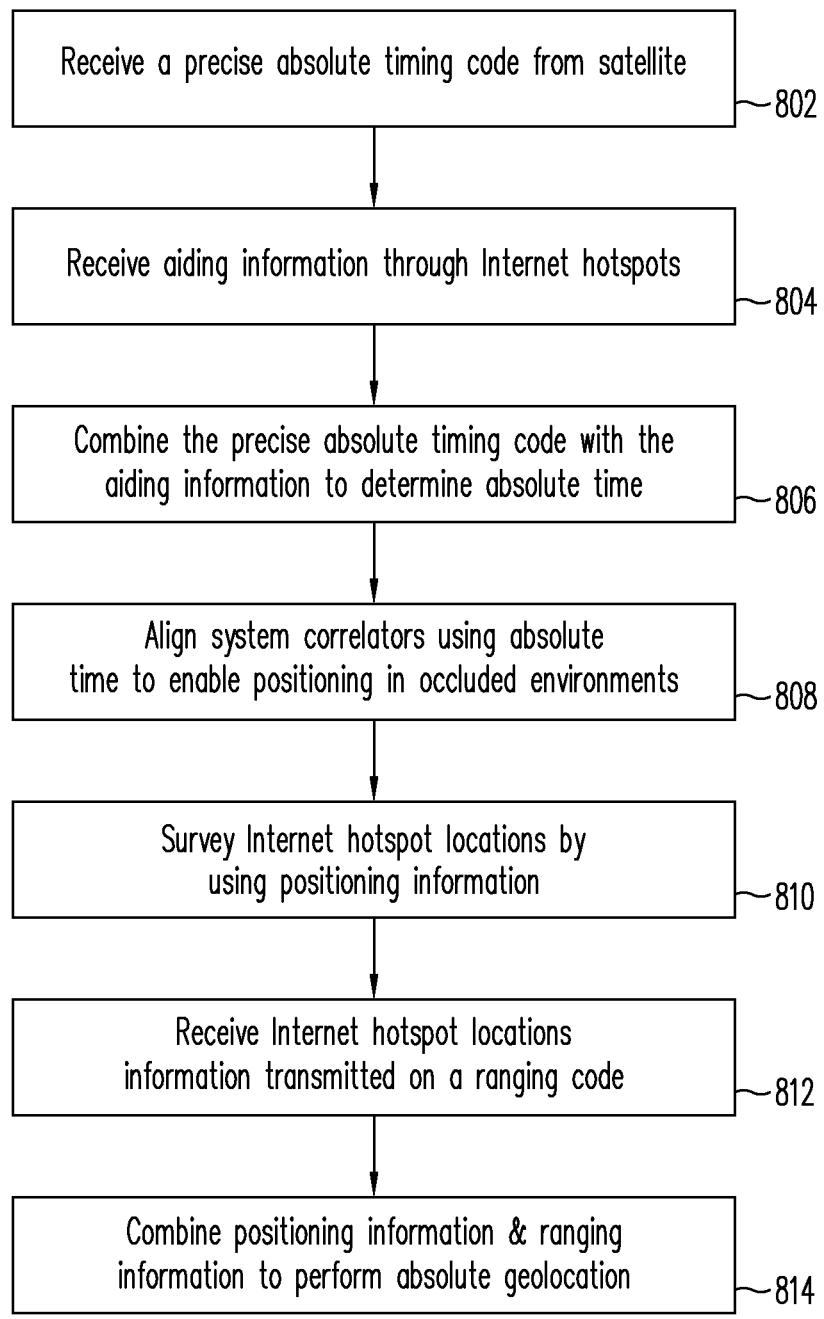
FIG. 5 provides a flow diagram illustrating a method for performing geolocation by integrating satellite signals and wireless network signals according to an embodiment of the present invention.

Referring to FIG. 5, a flow diagram illustrating a method for performing geolocation by integrating satellite signals and wireless network station signals is provided according to an embodiment of the present invention. The flow diagram of FIG. 5 may be implemented for use in the navigation system of FIG. 4. In this embodiment, satellite signals from, for example, Iridium satellites and GPS satellites may be integrated with WiFi or 802.11 type signals.

In block 802, receiver unit 302a receives precise absolute timing code signals 710 in the form of a repeatable code such as a pseudorandom code broadcasted from satellite 304a, for example a LEO satellite (as described above according to one or more embodiments with respect to FIGS. 1-35).

In block 804, receiver unit 302a receives aiding information via wireless network station 702, 704, and/or 706.

In block 806, the precise absolute timing code signals 710 are used with the aiding information from wireless network station 702, 704, and/or 706 to determine precise absolute time to within several microseconds accuracy.

In block 808, system correlators of receiver unit 302a, for example, GPS correlators, are aligned using the precise absolute time to facilitate positioning, for example GPS positioning, in occluded environments.

In block 810, receiver unit 302a surveys the locations of wireless network stations 702, 704, and 706 using the positioning information determined by using the precise absolute time.

In block 812, receiver unit 302a receives location information of wireless network stations 702, 704, and 706, which is transmitted on a ranging code.

In block 814, receiver unit 302a performs absolute geolocation by combining positioning information and ranging information from one or more of wireless network stations 702, 704, and 706.

In one embodiment, a roaming user's position (e.g., a position of receiver unit 302a), if desired, may be reported through wireless network stations 702, 704, and 706 and therefore facilitate user tracking.

Figure 6:
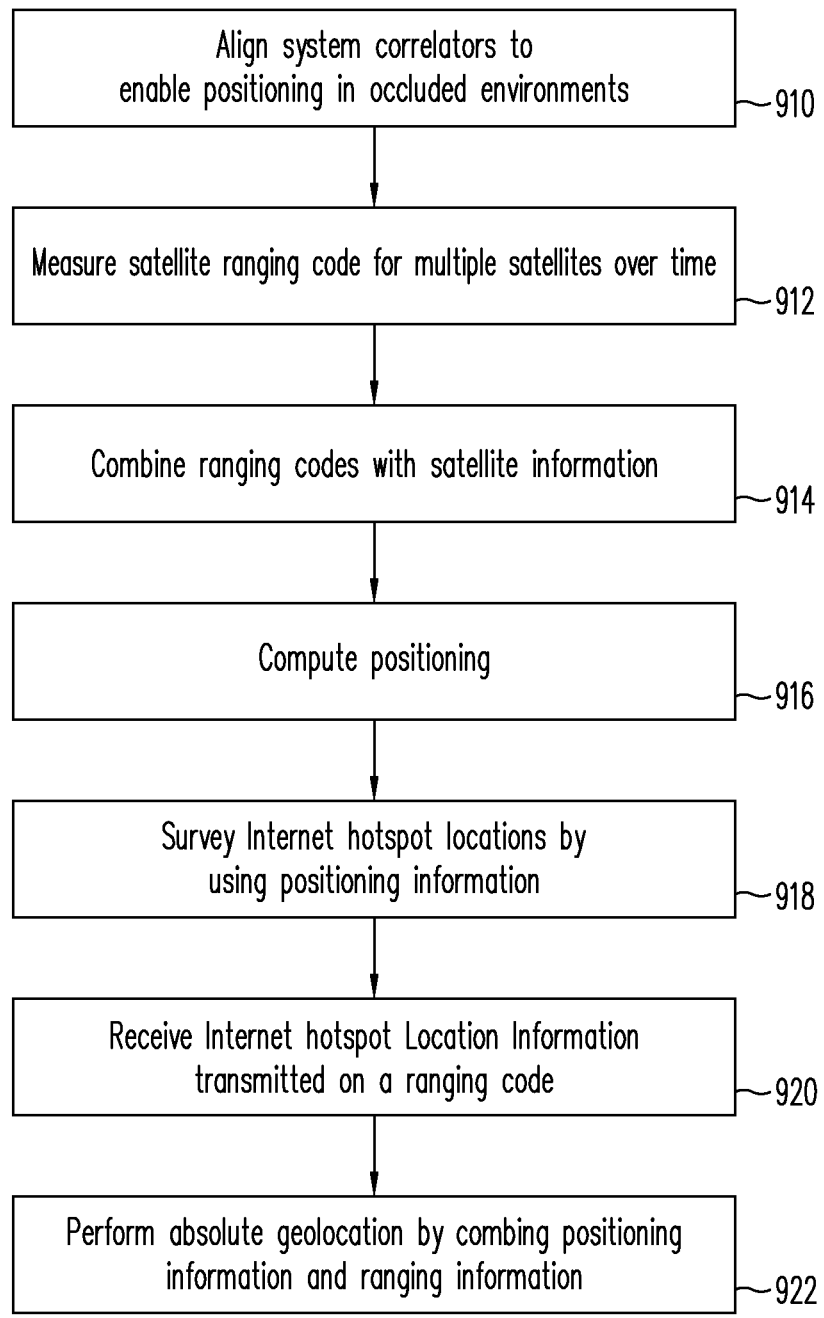
FIG. 6 provides a flow diagram illustrating a method for performing geolocation by integrating satellite signals and wireless network signals according to another embodiment of the present invention.

FIG. 6 provides a flow diagram illustrating a method for performing geolocation by integrating satellite signals and wireless network signals according to another embodiment of the present invention. The flow diagram of FIG. 6 may be implemented for use in the navigation system of FIG. 4. In this embodiment, positioning of the wireless network stations acting as beacons may also be achieved by integrating, for example, Iridium satellite signals (only) and WiFi or 802.11 type signals (with longer integration times).

It will be appreciated that the method described above with respect to FIG. 5 in blocks 802-806 may be used in this embodiment to determine precise absolute time to within several microseconds accuracy. Once absolute time is determined, in block 910 of FIG. 6, system correlators of receiver unit 302a are aligned by using the absolute time to facilitate positioning in occluded environments.

In block 912, receiver unit 302 measures a satellite ranging code (e.g., an Iridium iGPS ranging code) for multiple satellites over time.

In block 914, assuming wireless network stations 702, 704, and 706 are stationary, the ranging code is combined with satellite information such as orbit information and timing signals.

In block 916, receiver unit 302a computes positioning using multilateration by integrating multiple satellite (e.g. Iridium) passes iteratively.

In block 918, the locations of WiFi transceivers 702, 704, and 706 are surveyed by using the positioning information.

In block 920, receiver unit 302a receives the information on the locations of WiFi transceivers 702, 704, and 706, which is transmitted on a ranging code.

In block 922, receiver unit 302a performs absolute geolocation by combining positioning information and ranging information from one or more WiFi transceivers 702, 704, and 706.

Figure 7:
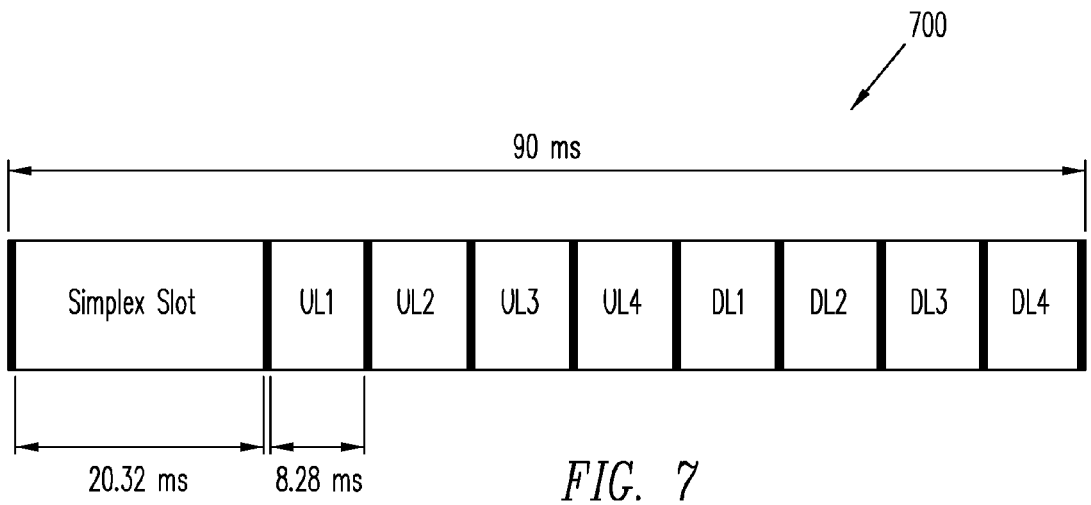
FIG. 7 illustrates a time interval that includes a simplex time slot and other time slots according to an embodiment of the present invention.

FIG. 7 illustrates a time interval 700 (e.g., also referred to as a frame or a time frame) that includes a simplex time slot and other time slots according to an embodiment of the present invention. As shown in FIG. 7, time interval 700 spans approximately 90 milliseconds and includes a simplex time slot spanning approximately 20.32 milliseconds, four uplink time slots UL1-UL4, and four downlink time slots DL1-DL4, each spanning approximately 8.28 milliseconds.

Communication channels may be implemented in a communication or satellite system (e.g., such as navigation system 300 or the Iridium satellite network) using a hybrid time division multiple access-frequency division multiple access (TDMA/FDMA) architecture based on time division duplexing (TDD) using a 90 millisecond frame (e.g., such as time interval 700). A particular channel may be, for example, a specific FDMA frequency (e.g., carrier frequency band) and TDMA timeslot (e.g., one of the simplex, uplink, or downlink time slots shown in FIG. 7). Channels also may be reused, for example, in different geographic locations by implementing acceptable co-channel interference constraints or other channel de-confliction methods such as time multiplexing. Thus, a channel assignment may comprise both a frequency carrier and a time slot within a frame.

In one embodiment, the simplex time slot may include an acquisition channel, which may use a known frequency that is held constant globally so that users around the world can universally access the acquisition channel. The acquisition channel may be a downlink channel, formatted using TDMA, that provides alerts to user devices that may include what frequency to access in order to complete the user's call. The TDMA structure of the acquisition channel may allow multiple alerts to be sent in one frame, such as time interval 700. Also, for example, other channels may support the user devices (e.g., cell phones or other compact electronic devices) by providing information required to enable channel acquisition and hand-off.

The acquisition channel may be utilized similarly to provide channel acquisition and hand-off information to user equipment (e.g., cell phones or other compact electronic devices). In situations where this might be used in relation to critical assets under attack, if the acquisition channel were jammed, that could result in key assets being unavailable during a critical need. To mitigate such a situation, a secondary transmission on one or more frequencies (e.g., there are four available messaging channels on the Iridium satellite system) may be broadcast. In principle, secondary transmissions could be broadcast, for example, over the entire 10 MHz Iridium frequency band. Such broad spectrum secondary transmissions may, for example, require a jammer to fan its power over the full 10 MHz spectrum in its attempt to jam the satellite system, and thus may reduce the jammer's potential for jamming.

In one example embodiment, such as the Iridium system, a twelve-frequency access band may be reserved for the simplex time slot channels (e.g., acquisition channel and messaging channels). These channels may be located in a globally allocated 500 kHz band between 1626.0 MHz and 1626.5 MHz. These frequency accesses may be used only for downlink signals and may be the only frequencies that may be transmitted during the simplex time slot. As shown in the following Table 1 for the Iridium example, four messaging channels and one ring alert channel are available during the simplex time slot.

TABLE 1

| Channel Number | Center Frequency (MHz) | Allocation |
| --- | --- | --- |
| 1 | 1626.020833 | Guard Channel |
| 2 | 1626.062500 | Guard Channel |
| 3 | 1626.104167 | Quaternary Messaging |
| 4 | 1626.145833 | Tertiary Messaging |
| 5 | 1626.187500 | Guard Channel |
| 6 | 1626.229167 | Guard Channel |
| 7 | 1626.270833 | Ring Alert |
| 8 | 1626.312500 | Guard Channel |
| 9 | 1626.354167 | Guard Channel |
| 10 | 1626.395833 | Secondary Messaging |
| 11 | 1626.437500 | Primary Messaging |
| 12 | 1626.479167 | Guard Channel |

The four messaging channels, located on alternative frequencies along with the ring channel (ring alert channel) in the simplex time slot, may be used for channel acquisition and transferring a precise absolute time in case the ring channel for some reason was unavailable (e.g., if the ring channel were being jammed). The messaging channels for Iridium (as shown in Table 1) are channels 3, 4, 10, and 11, which are, respectively, the quaternary, tertiary, secondary, and primary messaging channels. Thus, in one embodiment, a satellite may transmit a data signal (e.g., ring message data including L band frames from which a precise absolute time is available for a receiver unit) on an acquisition channel (e.g., ring channel for Iridium) and on messaging channels (e.g., on a time slot and frequencies) according to a known (a priori) or a predictable pattern that can be computed from a time parameter value (e.g., frequency hopping, TDMA/FDMA).

Specific information (e.g., LBFC, space vehicle identification (SVID), x, y, and z position coordinates of the satellite) may be used to align a receiver clock to acceptable accuracy to allow detection of a frequency (e.g., one of the messaging frequencies shown in Table 1) which may allow the receiver unit to gain access to use the system. It is possible that data used for acquisition (such as LBFC, SVID) in the absence of acquisition channel availability, may be located in its entirety in one alternate messaging channel. In some alternative embodiments, acquisition data also could be located in parts across multiple alternate messaging channels that, for example, have different encryptions. Such an embodiment may provide a useful implementation for further reducing unauthorized accessibility of the information, in general, or in case there was a concern that one encryption or both encryption methods could be at risk due to rogue users. For example, in a situation in need of high security, in one messaging channel one portion of the acquisition data could be provided to the receiver unit via one encryption method and a second portion of the acquisition data could be provided via a second encryption method. Furthermore, the acquisition data could be nested in that additional security information may be accessed via one channel in order to access another channel.

Figure 8:
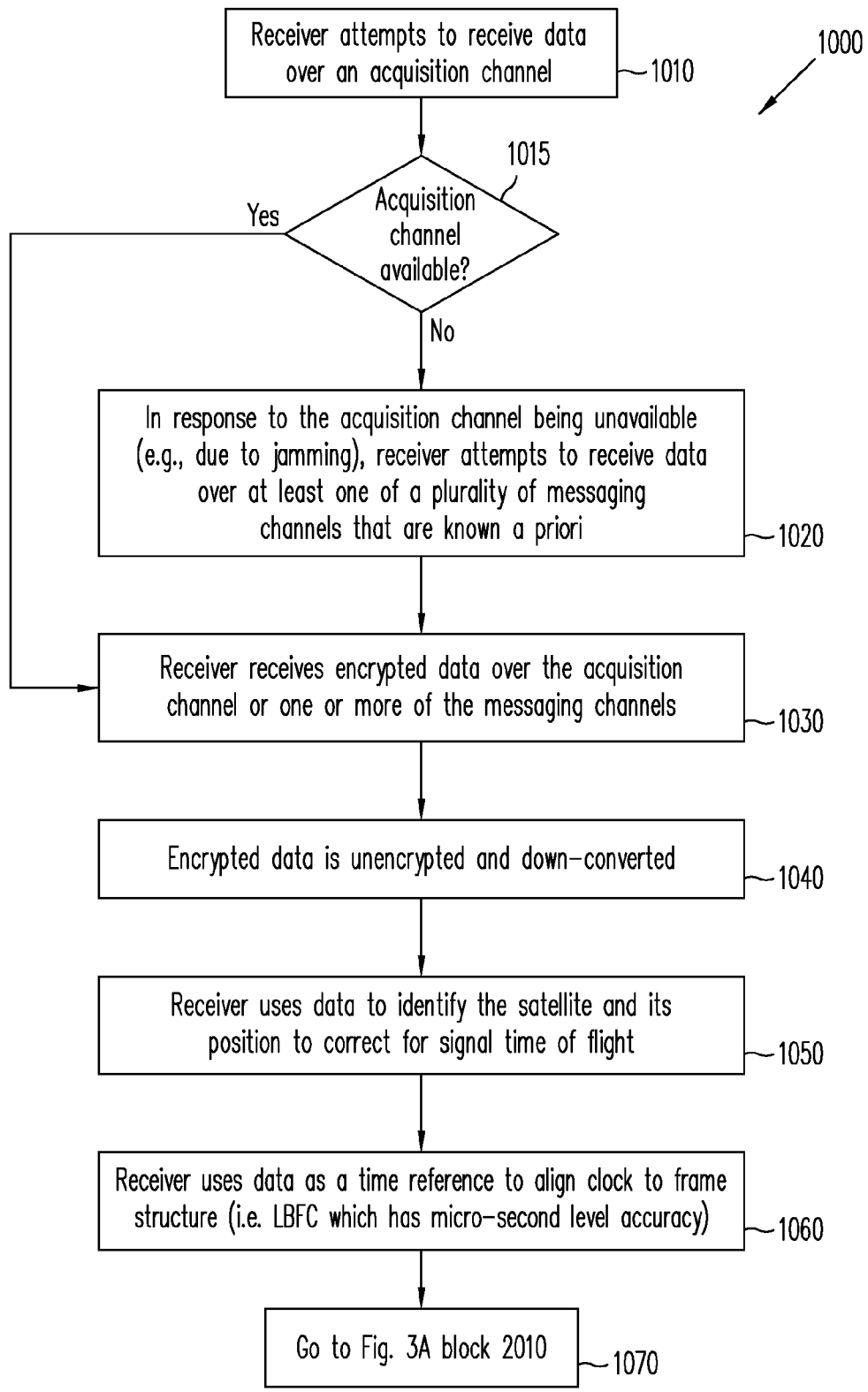
FIG. 8 is a flow diagram illustrating a method for initiating a receiver for obtaining precise absolute time transfer from a satellite according to an embodiment of the present invention.

FIG. 8 illustrates a method 800 for initiating a receiver unit for obtaining precise absolute time transfer from a satellite according to an embodiment of the present invention. At block 1010, a receiver unit (e.g., such as any of the various receiver units described herein) may attempt to receive data over an acquisition channel from a satellite such as satellite 304 which may be a low earth orbit (LEO) satellite (e.g., an Iridium satellite). The receiver unit may attempt to receive data in the form of a ring message (also referred to as "visit message") from the acquisition channel.

A typical ring or visit message, when decoded, may contain information such as the following: LBFC=485215784; SVID=34; Beam ID=6; X Coordinate=127; Y Coordinate=−1140; Z Coordinate=1102.

In this regard, the SVID may be used to understand which satellite is relaying the information in the message. The Beam ID number may not be needed for providing information, but may be used by the receiver unit in applicable applications utilizing geolocation as described, for example, in U.S. patent application Ser. No. 12/756,961 filed Apr. 8, 2010, which is incorporated herein by reference in its entirety. The X, Y, and Z coordinates are the coordinates for the satellite's position and may be used to correct the time of flight of the signal from the space vehicle (satellite) to the receiver unit. The X, Y, Z coordinates may also be used for geolocation.

Regarding the LBFC number, Iridium burst sequences occur every 90 milliseconds in what is called an L-band frame. The LBFC number is effectively a clock with microsecond accuracy. The LBFC number may be, for example, a 32-bit number that counts the number of 90 millisecond frames from a known reference start time (e.g., also referred to as an "era"). For example, a start time of 12:00 am is shown in FIG. 3. Because the edge of the L band frame (and thus the LBFC) is accurate at the microsecond level, the ring message acts like and can be used as a very accurate clock that ticks every 90 milliseconds.

In block 1015, if the acquisition channel is available, then the receiver unit may receive the ring message data from the acquisition channel, and the method continues to block 1030. Otherwise, the method continues to block 1020.

In this regard, reliance on a known fixed frequency channel (e.g., the acquisition channel) as the only predictable location to find the key acquisition information described above can make any vital resources utilizing Iridium to support its applications more susceptible to interference. By putting this same key acquisition information on the above-described simplex time slot messaging channels, the receiver unit, as identified at block 1020, may attempt to receive (e.g., search among the alternative messaging channels) the channel acquisition data (e.g., ring message data) from one of the messaging channels (e.g., channels 3, 4, 10, 11 described above). By putting the ring message data on the simplex time slot messaging channels, the satellite system may spread out the jamming threat to multiple frequencies, and may also be able to increase the signal power by 9 dB, making the satellite system more robust with regard to jamming.

At block 1030, the receiver unit may receive the encrypted ring message data on one of the messaging channels (e.g., or over the acquisition channel if available as determined in block 1015). In various embodiments, the encoding of the ring message data can be specially encrypted for special users (e.g., the U.S. military).

For example, there may be several different ways to reformat the existing Iridium satellite system to give special users increased priority. One option, for example, may be through additionally expanding call precedence and priority levels to include more levels, assigning levels, e.g., quality of service (QoS) or level of service (LoS), or adding a levels-queuing methodology to the system. For example, calls for a critical application may be assigned a higher priority represented by a particular number, e.g., 4. In the case these calls were not able to access the acquisition channel, the call may have a back-up frequency of one or more of the four channels to access the required information from. In addition, subscriber identification module (SIM) cards or other similarly functioning devices may be programmed with a specific acquisition class as defined for the Iridium acquisition control scheme or the acquisition control scheme may be expanded to meet this special case. The signals for these special cases may be encrypted to add an additional layer of security. The encrypted ring message data may be decrypted and down-converted by the receiver unit at block 1040.

At block 1050, the receiver unit may use the decrypted ring message data to identify the satellite from which the ring message data is being received and may use the position coordinate information in the ring message data to correct for time of flight of the signal between the satellite and the receiver unit. In order to obtain precise time, the receiver unit can use the L-Band Frame Count (LBFC) in the following equation, which is similar to equation 406 shown in FIG. 3:

Time=LBFC×90 ms+Current Era Date and Start Time

In the above equation, the Current Era Date and Start Time may be based on a known date and time as defined for the system (e.g., the Iridium system) and which the receiver unit may have a priori knowledge of. Each L band frame is repeated (LBFC increments, 2.5 e.g., adds 1 to the count) every 90 milliseconds. The edge of the L band frame (e.g., the instant in which the receiver unit receives the signal) may allow the receiver unit to maintain the accuracy of the receiver unit's time (e.g., align the receiver unit's local clock, at block 1060) to the microsecond level. The receiver unit first corrects for the time of flight of the signal, however, and in order to do so the receiver unit should know the satellite that is providing the data (SVID) as well as where that satellite is located in the sky (X, Y, and Z coordinates) in the appropriate coordinate system. Both of these pieces of information may be available in the ring message data, as described above. In addition, for enhanced accuracy, the receiver unit may have access to an orbit model for the satellite. The receiver unit may have the orbit model locally or the orbit model may be carried on a network (e.g., network 308) which the receiver unit may access to retrieve and process information as necessary.

At block 1070, receiver unit may perform the process of FIG. 3A beginning at block 2010 to determine the code phase of the received satellite signal as discussed.

Figure 9:
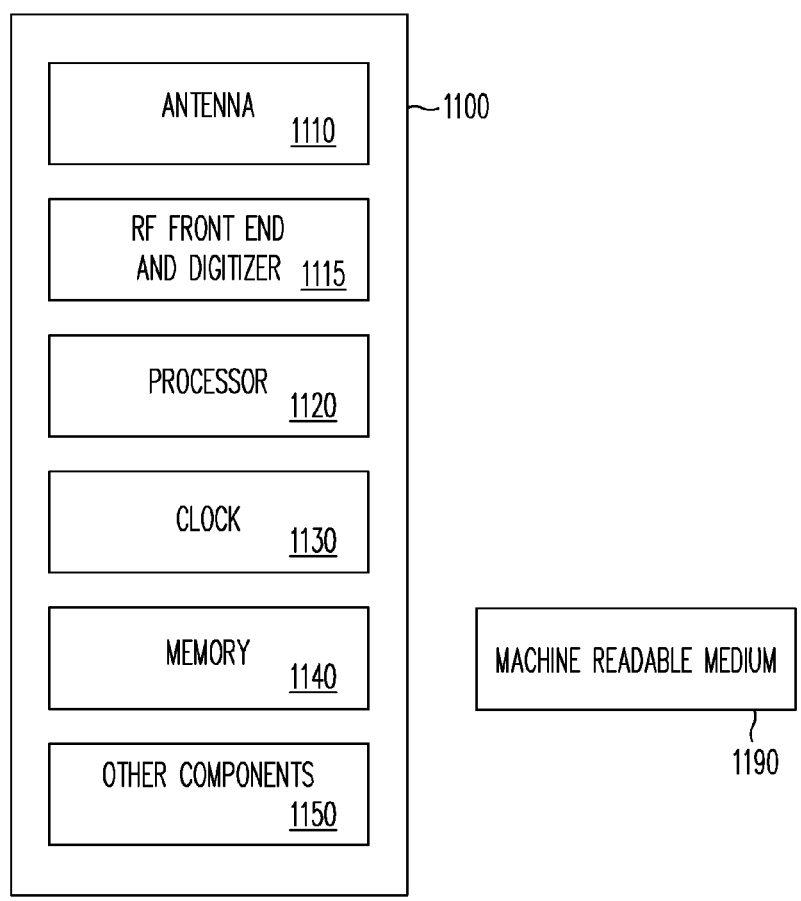
FIG. 9 is a block diagram illustrating various components that may be used to implement a receiver unit according to an embodiment of the present invention.

FIG. 9 is a block diagram illustrating various components that may be used to implement a receiver unit 1100 according to an embodiment of the present invention. In this regard, receiver unit 1100 may be used to implement any of the various receiver units described herein. For example, in one embodiment, receiver unit 1100 may be used to implement a navigation device.

Receiver unit 1100 may include an antenna 1110, a radio frequency (RF) front end and digitizer 1115, a processor 1120, a clock 1130, a memory 1140, and other components 1150.

Antenna 1110 may be implemented as one or more antennas used to send and/or receive signals in accordance with the various embodiments described herein.

RF front end and digitizer 1115 may include amplifiers, a radio frequency down converter, and analog to digital (A/D) converter. RF front end and digitizer 1115 may process signals from antenna 1110 and provide information from the signals to processor 1120.

Processor 1120 may be implemented as one or more processors that may execute appropriate instructions (e.g., software) stored in one or more memories 1140 as well as in one or more non-transitory machine (or computer) readable media 1190 (or both). Clock 1130 (e.g., a receiver clock) may be a clock that may be aligned or operated in accordance with the various techniques described above.

Other components 1150 may be used to implement any other desired features of receiver unit 1100. It will be appreciated that, where appropriate, one or more satellites described herein may be implemented with the same, similar, or complementary components as those illustrated in FIG. 9.

According to an embodiment, a roaming user's position (if desired) may be reported through the wireless network and therefore facilitate user tracking.

To determine ranging, for example, the differential time of arrival may be determined. The WiFi transceivers may send a message to receiver unit 302a, for example, a telephone or a computer, and as soon as it is received a message is sent back to the WiFi transceivers. The processing period of the computer or telephone is known. The WiFi transceivers know how long receiver unit 302a took to respond back to the WiFi transceivers. Thus, the differential time of arrival (DTOA) may be computed and would be equal to the processing period of the receiver unit plus the time it took for the message to get back to the WiFi transceivers.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, may be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

We claim:

1. A method of transferring precise absolute time from a satellite to a device, the method comprising:
   receiving data from a messaging channel, wherein the data has a frame structure;
   using the data to identify the satellite and a position of the satellite;
   correcting for signal time of flight using the satellite identity and the position of the satellite;
   using the data as a time reference to align a receiver clock to the frame structure;
   with the receiver clock aligned to the frame structure, receiving a precision time signal from the satellite, wherein the precision time signal comprises a periodic repeating code;
   determining a timing phase of the code; and
   using the timing phase to determine a precise absolute time.

2. The method of claim 1, further comprising:
   receiving the data from the messaging channel in response to an acquisition channel being unavailable, wherein the messaging channel is distinct from the acquisition channel.

3. The method of claim 1, wherein:
   the messaging channel is one of a plurality of messaging channels carrying the data.

4. The method of claim 1, wherein:
   the messaging channel is one of a plurality of messaging channels carrying the data and for which a priori acquisition information is possessed by the receiver.

5. The method of claim 1, wherein:
   the messaging channel is one of a plurality of distinct messaging channels carrying the data from the same satellite.

6. The method of claim 1, wherein:
   the messaging channel is one of a plurality of messaging channels carrying the data;
   at least one of the messaging channels carries data from a different satellite from the satellite; and
   the satellite and the different satellite are in the same satellite constellation.

7. The method of claim 1, wherein:
   the messaging channel is one of a plurality of messaging channels carrying the data;
   at least one of the messaging channels carries data from a different satellite from the satellite; and
   the satellite and the different satellite are in different satellite constellations.

8. The method of claim 1, wherein:
   the frame structure is an L band frame structure; and
   the data includes an L band frame count (LBFC).

9. The method of claim 1, wherein the data includes at least one of X, Y, and Z coordinates for the position of the satellite or a satellite vehicle identification (SVID) of the satellite.

10. The method of claim 1, wherein:
    the messaging channel is one of a plurality of messaging channels carrying the data; and
    the device is programmed with a specific acquisition class according to a priority levels-queuing methodology for receiving data on a back-up frequency of one or more of the plurality of messaging channels.

11. A receiver unit adapted for use in attenuated or jammed environments, comprising:
    an antenna adapted to receive a signal from a satellite acquisition channel or a messaging channel;
    a processor;
    a receiver clock; and
    a memory for storing a plurality of machine readable instructions which when executed by the processor cause the receiver unit to:
      receive data from the acquisition channel or the messaging channel, wherein the data has a frame structure,
      use the data to determine an identity of the satellite and a position of the satellite,
      correct for signal time of flight using the identity of the satellite and the position of the satellite,
      use the data as a time reference to align the receiver clock to the frame structure,
      with the receiver clock aligned to the frame structure, receive a precision time signal from the satellite, wherein the precision time signal comprises a periodic repeating code,
      determine a timing phase of the code, and
      use the timing phase to determine a precise absolute time.

12. The receiver unit of claim 11, wherein the instructions when executed by the processor further cause the receiver unit to:
    receive the data from the messaging channel in response to an acquisition channel being unavailable, wherein the messaging channel is distinct from the acquisition channel.

13. The receiver unit of claim 11, wherein:
    the messaging channel is one of a plurality of messaging channels carrying the data.

14. The receiver unit of claim 11, wherein:
    the messaging channel is one of a plurality of messaging channels carrying the data and for which a priori acquisition information is possessed by the receiver unit.

15. The receiver unit of claim 11, wherein:
    the messaging channel is one of a plurality of distinct messaging channels carrying the data from the same satellite.

16. The receiver unit of claim 11, wherein:
    the messaging channel is one of a plurality of messaging channels carrying the data;
    at least one of the messaging channels carries data from a different satellite from the satellite; and
    the satellite and the different satellite are in the same satellite constellation.

17. The receiver unit of claim 11, wherein:
the messaging channel is one of a plurality of messaging channels carrying the data;
at least one of the messaging channels carries data from a different satellite from the satellite; and
the satellite and the different satellite are in different satellite constellations.

18. The receiver unit of claim 11, wherein:
the frame structure is an L band frame structure; and
the data includes an L band frame count (LBFC).

19. The receiver unit of claim 11, wherein the data includes a satellite vehicle identification (SVID) of the satellite.

* * * * *